United States Patent [19]

Yamada et al.

[11] Patent Number: 4,889,621
[45] Date of Patent: Dec. 26, 1989

[54] OIL STRAINER FOR AN AUTOMATIC TRANSMISSION

[75] Inventors: Yoshihiro Yamada, Anjo; Ryoichi Shirai, Okazaki; Youichi Hayakawa, Toyoake, all of Japan

[73] Assignee: Aisin Aw Co., Ltd., Anjo, Japan

[21] Appl. No.: 293,393

[22] Filed: Jan. 4, 1989

[30] Foreign Application Priority Data

Jul. 25, 1988 [JP] Japan .................. 63-185735

[51] Int. Cl.$^4$ .............................. F01M 0/00
[52] U.S. Cl. .................. 210/168; 210/446; 210/450; 55/502; 74/467; 74/701
[58] Field of Search ............... 210/168, 445, 446, 450; 55/502; 74/701, 467

[56] References Cited

U.S. PATENT DOCUMENTS

| 2,341,414 | 2/1944 | Polivka | 210/446 |
| 4,341,538 | 7/1982 | Vadnay | 210/445 |
| 4,366,724 | 1/1983 | Yamamori et al. | 74/701 |
| 4,666,594 | 5/1987 | Schneider | 210/168 |

FOREIGN PATENT DOCUMENTS

| WO8501885 | 5/1985 | PCT Int'l Appl. |
| 1541981 | 3/1979 | United Kingdom. |
| 2079168 | 1/1982 | United Kingdom. |
| 2102690 | 2/1983 | United Kingdom. |

*Primary Examiner*—Bernard Nozick
*Attorney, Agent, or Firm*—Kanesaka and Takeuchi

[57] ABSTRACT

A thick-walled, narrow-width oil strainer positioned in a space formed between the contact surfaces of the transaxle casing and transaxle housing of an automatic transmission is disclosed. Both the upper body and lower bodies of the oil strainer are constructed with an angled cross section to provide a deep suction section and a deep discharge section. A filter element is supported by being interposed between the peripheral edge sections and supporting bosses of the two bodies, and is slanted at a prescribed angle with respect to the suction section and the discharge section. The strainer is mounted with the right and left openings of the discharge section interposedly supported by the pump body and the transaxle casing, so that the oil discharged from the valve body is sucked directly into the pump through the suction section, and the oil in the oil sump is sucked into the pump through the filter element.

3 Claims, 9 Drawing Sheets

F I G. 2
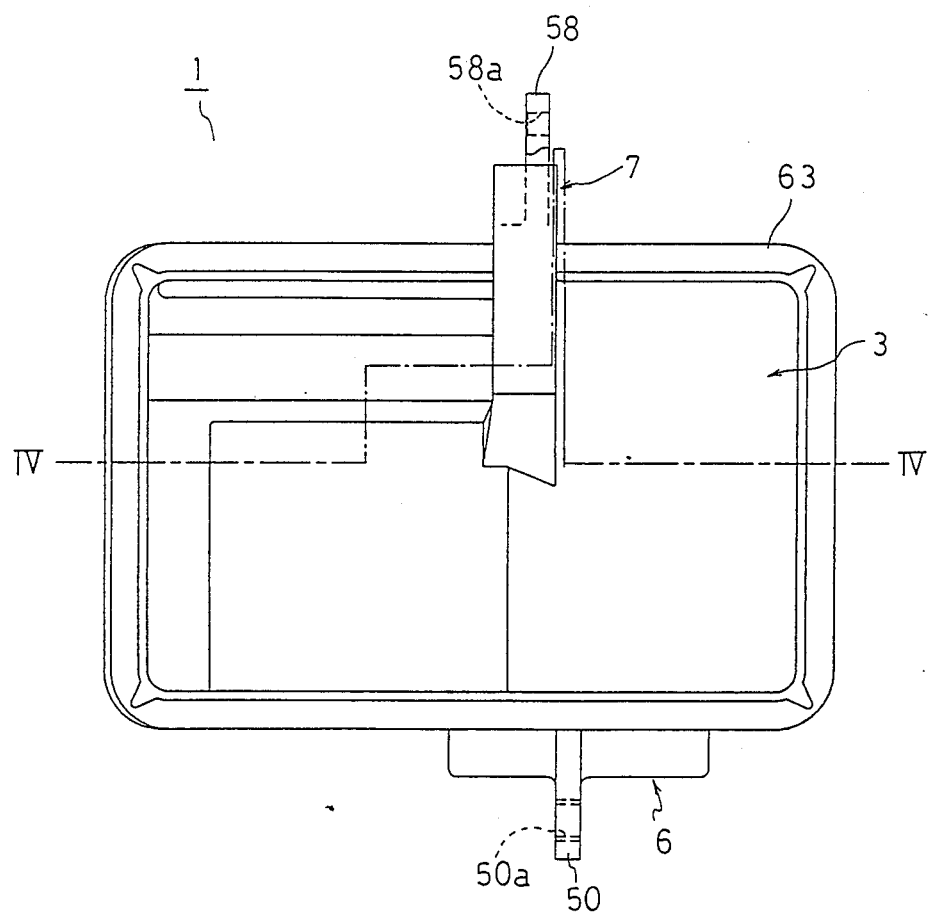

F I G. 9
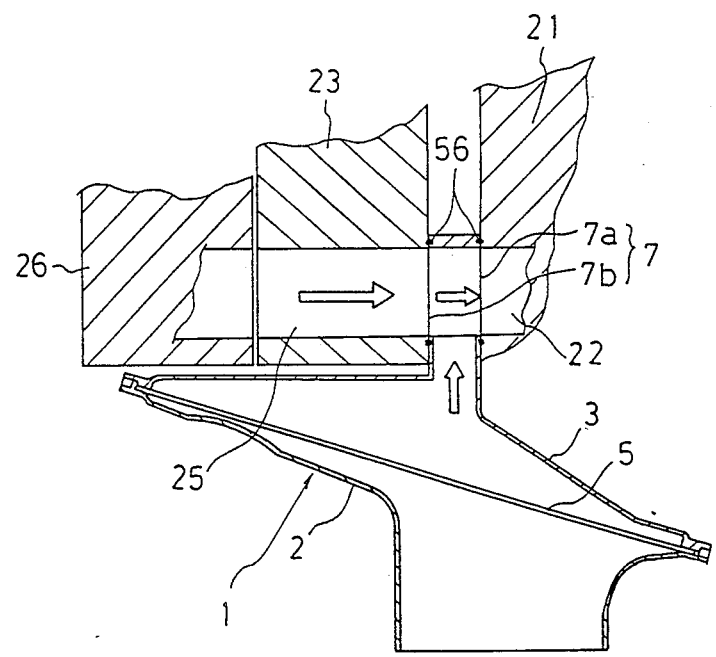

OIL STRAINER FOR AN AUTOMATIC TRANSMISSION

BACKGROUND OF THE INVENTION

1. Field of the Invention

The present inventin relates to an oil strainer for an automatic transmission and to the automatic transmission using the oil strainer, and, in particular, to the structure of a strainer for an automatic transmission having a channel leading from a valve body directly to an oil pump and a channel leading from an oil sump through a filter element to an oil pump, and to the structural arrangement of the oil strainer in the automatic transmission.

2. Description of the Prior Art

Conventionally, for example, in providing an oil strainer as shown in Japanese Laid Open Patent No. Sho-58-44006, a metal sheet is subjected to a stamping process to form a dish-shaped base member with a peripheral edge shoulder section and a flat wall section having a large number of supporting bosses. Mounted onto this dish-shaped base member is a filter element having a fiber mesh securely mounted to a filter frame with a plurality of ribs.

This strainer has a flat shape and is housed in an oil pan secured on the bottom of a transaxle casing. The oil in the oil pan is sucked into the oil strainer through a filter element, passes through a flow channel made up of the spaces formed from the ribs of the filter frame and the supporting bosses of the dish-shaped base member and is conducted to a discharge port.

However, such an oil strainer as described above is made in a flat form, and the flow channel is small because of the space between the filter element and the dish-shaped base member, so that the volume of oil sucked into the pump is restricted. In addition, the ribs and supporting bosses are present in the narrow flow channel, so the resistance in the flow channel is also high. It is also easy for large pieces of foreign matter to accumulate near the discharge port, so that when the flow resistance becomes high from blinding of the filter element and the like, the filter element bends from the high suction pressure, causing the filter element to be tightly pressed to the walls of the dish-shaped base member, further restricting the flow channel.

In addition, since this type of oil strainer is positioned on the bottom of the oil pan, it is necessary to have a special type of securing means, such as a large number of bolts and the like, to secure it to the casing, and an oil channel to the oil pump is required. Assembly is a problem, and at low temperatures, resistance in the pipeline increases causing line pressure drop.

SUMMARY OF THE INVENTION

An object of the present invention is to provide, with due consideration to the drawbacks of such conventional devices, a strainer for use with an automatic transmission, and to provide an automatic transmission using this strainer, with a compact structure and large flow channel area, which is easily assembled, and in which one part of the oil is fed directly from the valve body, and another part of the oil is conducted directly to the oil pump passing through the filter element.

In the present invention this object is achieved by the provision of, for example, as shown in FIG. 1 to FIG. 4, an oil strainer (1), for use with an automatic transmission, comprising a suction side body (2), a discharge side body (3), and a filter element (5) interposed between these two bodies, wherein the bodies (2) and (3) are constructed with an angled cross section to provide a deep suction section (6) and a deep discharge section (7), and have peripheral edge sections (9), (10) mutually contacted to form an oiltight structure, and bottom surfaces (11), (12) from which a plurality of supporting bosses (13), (15) project. The filter element (5) has a peripheral edge section (16a) interposed between the peripheral edge sections (9), (10) of the two bodies (2), (3) and a central section (16b) supported by the supporting bosses (13), (15), and the filter element (5) is secured between the two bodies (1), (2), such that the central section (16b) is slanted at a prescribed angle with reference to the suction section (6) and the discharge section (7).

Further, it is desirable that an arc-shaped section (11a) be formed on the bottom surface (11) adjacent to the peripheral section (9) remote from the suction section (6) on the suction side body (2).

In the automatic transmission which uses the oil strainer of the present invention, as shown, for example, in FIG. 6 to FIG. 9, the discharge section (7) formed in the discharge body (3) of the oil strainer (1) is provided with a pair of openings (7a), (7b) on the right and left sides in the drawings. The oil strainer (1) is held between the pump body (21) and the transaxle casing (23), so that the right and left side openings (7a), (7b) in the discharge section of the oil strainer (1) are respectively contacted in an oiltight manner with a suction port (22) of a pump body (21) and an oil channel opening (25) formed in a transaxle casing (23). Oil passing through the filter element (5) of the strainer (1), is supplied to a suction port (22) of the pump body (21) together with the oil directly discharged from a valve body (26) through the oil channel (25) of the transaxle casing (23).

Based on the above configuration, the oil in the oil sump is sucked from the suction section (6) of the oil strainer (1), any foreign matter such as iron particles and the like is removed by the filter element (5), and the oil is sucked into the pump from the suction section (7). At the time, the oil strainer (1), based on the bodies (2), (3) formed in an angled shape, has a large flow channel area to cope with the flow volume, and an adequate flow rate is obtained without being subjected to a large flow channel resistance. Based on the angled positioning of the filter element (5), a large filter area is obtained, in comparison with the projected area.

Any foreign matter trapped in the filter element (5), in particular, large pieces of foreign matter which easily flow along with the fluid, pass over the arc-shaped section (11a) and accumulate in a peripheral section (19).

The oil strainer (1), when the pump body (21) is secured in the transaxle casing (23), is mounted by interposing between the two members (21), (23) without carrying out any troublesome installation procedures. Then, in the automatic transmission (A) on which the oil strainer (1) is mounted, the clean oil from the valve body (26), passing through the oil channel (25) of the casing (23), is conducted into the opening (7b) of the discharge section (7), and then sucked into the suction port (22) of the pump body (21) from the opposing opening (7a), and the shortage originating in the oil used for lubrication is made up by oil which is supplied from the oil pump through the suction section (6) and the filter element (5) of the strainer (1) to the discharge section (7) and sucked from the opening (7a) into the suction port (22) of the pump body (21). At this time, the oil is fed from the valve body (26) to the pump suction port (22) through a short oil channel, and is also fed from the oil strainer (1) directly to the pump suction port (22). The resistance in the piping is extremely small.

Incidentally, the reference numerals in the parentheses are used only for reference with the drawings and do not limit the structure of the invention. The same number may be named differently in the following description and in the previous description in which broader concepts are adopted.

BRIEF DESCRIPTION OF THE DRAWINGS

FIG. 2 is a plan view of the oil strainer of the present invention.

FIG. 9 is a schematic cross sectional view showing the connections of the oil strainer of the present invention.

DETAILED DESCRIPTION OF THE PREFERRED EMBODIMENTS

The present invention will now be explained with reference to the drawings of an embodiment of the present invention.

Figure 6:
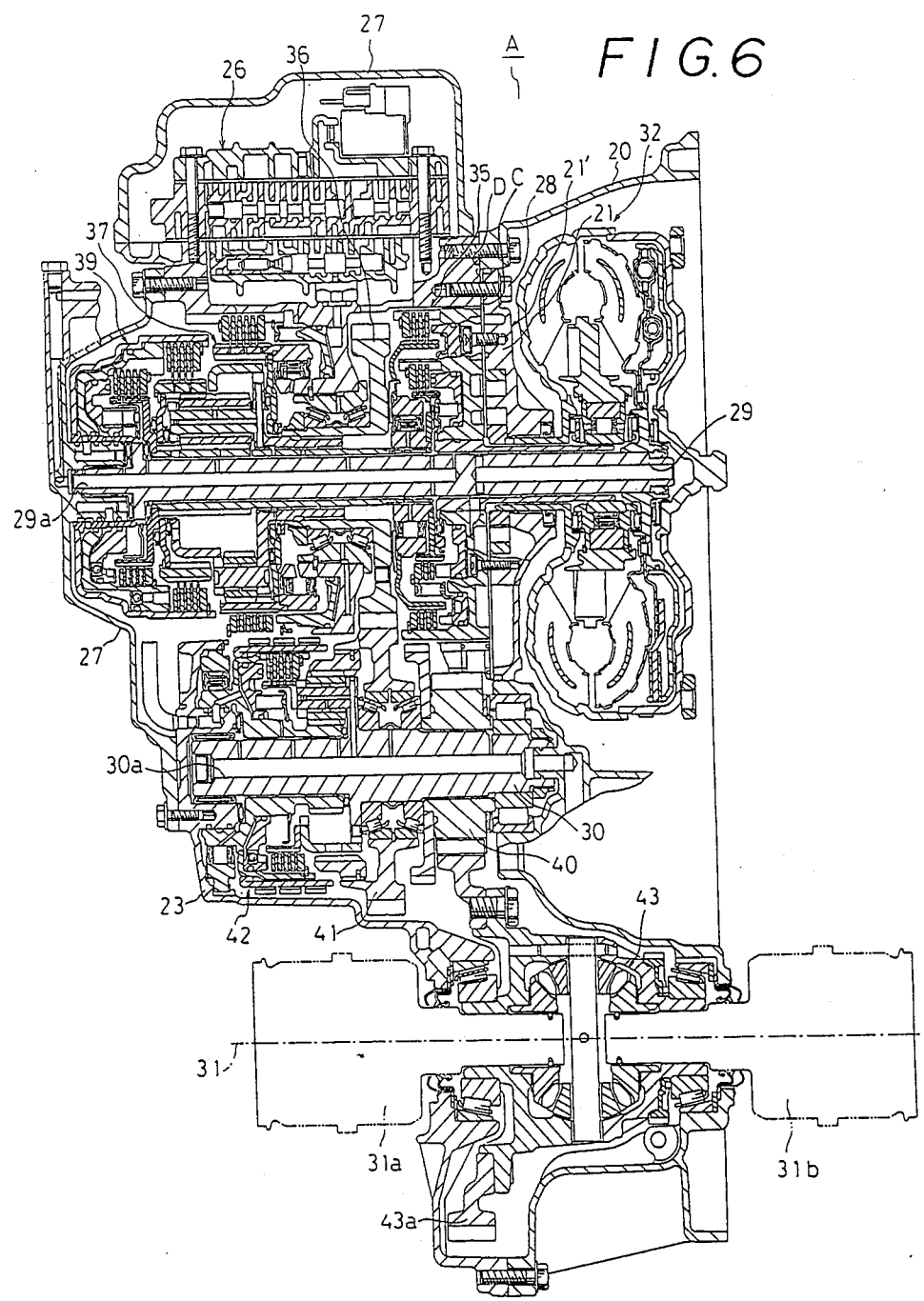
FIG. 6 is a cross sectional view of an automatic transmission constructed in accordance with the present invention.
Figure 7:
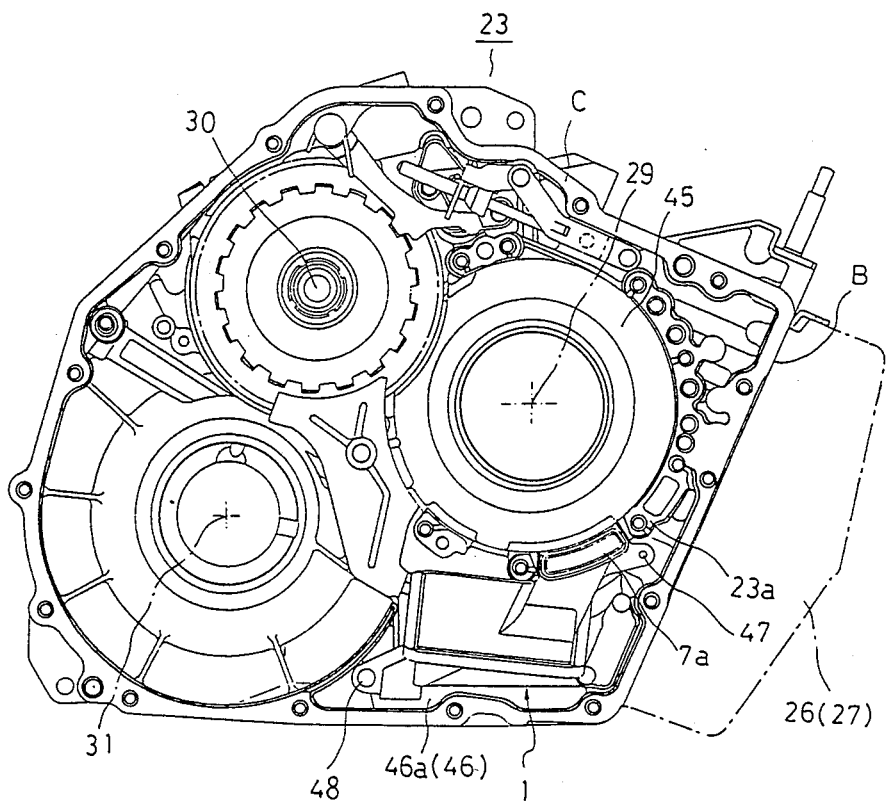
FIG. 7 is a drawing showing the front view of the transaxle casing of the automatic transmission used in the present invention.
Figure 8:
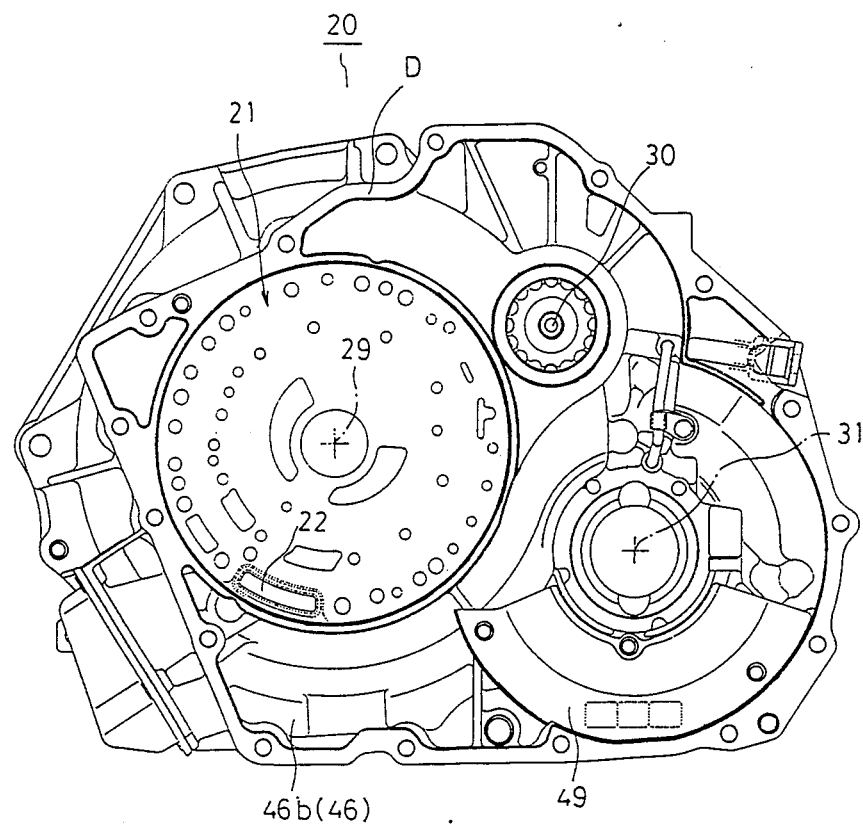
FIG. 8 is a drawing showing the rear view of the transaxle casing of the automatic transmission used in the present invention.

Now referring to FIG. 6, an automatic transmission A comprises a transaxle housing 20, a transaxle casing 23, and a transaxle cover 27. The housing 20 and the cover 27 are secured to both sides of the casing 23 respectively to form an integrated casing. Within this integrated casing a first shaft 29 is supported concentrically with an engine crankshaft. A third shaft 31 comprising the front axle is also supported within the integrated casing, and a second shaft 30 is supported in a manner so that these three shafts come on the apex of a triangle, as shown in FIG. 7 and FIG. 8. On the first shaft 29, there are successively arranged, from the engine side, a torque converter 32, an oil pump 21', a brake section 35, a counter drive gear 36, a three-speed transmission gear section assembly 37 comprising a single and a dual planetary gear, and a clutch section 39. On the second shaft 30 there are arranged an output gear 40, a counterdriven gear 41, and a two-speed transmission gear section 42 which switches between the directly connected rotation and the reduced speed rotation. In addition, a front differential device 43 is arranged on the third shaft 31. A left front axle 31a and a right front axle 31b extend from the differential device 43.

Now referring to FIG. 6 and FIG. 7, a side surface B of the transaxle casing 23 is formed by a slanted surface facing downward at an angle. A valve body 26 is secured together with the cover 27 by means of a bolt on the slanted side surface B. A front surface C of the transaxle casing 23 forms a connecting surface linked to the rear surface D of the transaxle housing 20 as shown in FIG. 8. Below a portion including the valve body 26 close to the front surface C of the casing 23, specifically, below a housing section 45 for accommodating a part (a brake section 35) on the first shaft 29, a space 46a is formed. Below a portion close to the rear surface D of the housing 20 opposing the space 46a, specifically, below the oil pump 21' and the torque converter 32, a space 46b is formed. A comparatively large space 46 formed from these spaces 46a and 46b becomes the oil sump, and becomes the space for accomodeting the oil strainer 1 of the present invention.

An oil channel 25 is formed on a bulkhead 23a of the housing section 45 close to the front surface C of the transaxle casing 23, as shown in FIG. 9. One end of the oil channel 25 has a barely indented portion opening with respect to the front surface C, and the other end communicates with the oil discharge port of the valve body 26. A positioning pin 47 is provided diagonally upward of the space 46a close to the front surface C of the casing 23. The pin 47 is, as will be later described, inserted into a positioning pin hole in the oil strainer 1. A bolt hole penetrates in a portion diagonally downward of the hole 46a. This bolt hole, as is later described, is used to secure the oil strainer 1 using a bolt 48. In addition, the pump body 21 of the oil pump 21' is secured, as shown in FIG. 8, by means of a plurality of securing bolts 28, as shown in FIG. 6, screwed into a plurality of bolt holes on the front surface C of the casing 23. The suction port 22 opens into the pump body 21 facing the front surface C. The oil entering the suction port 22 is suitably discharged by the pump 21'.

Incidentally, in FIG. 8, the joined surfaces C and D are shown in a separated state so that the rear surface D of the housing 2 is uncovered to show the suction port 22. However, in actual assembling operation, the housing 20 is secured in the casing 23 before the pump 21' and the like is assembled, so that the status in which the pump body 21 is assembled in the housing 20, as shown in FIG. 8, is not produced.

Further, an oil reservoir plate 49 is secured on the housing 23 to cover the lower part of the front differential device 43 mounted on the third shaft 31. The plate 49 ensures that the lubrication oil is supplied to the differential device 43 as well as to a ring gear 43a attached to the differential device 43 and to an output gear 40 which engages the ring gear 43a.

The oil strainer 1 mounted in the space 46 will now be explained.

Figure 1:
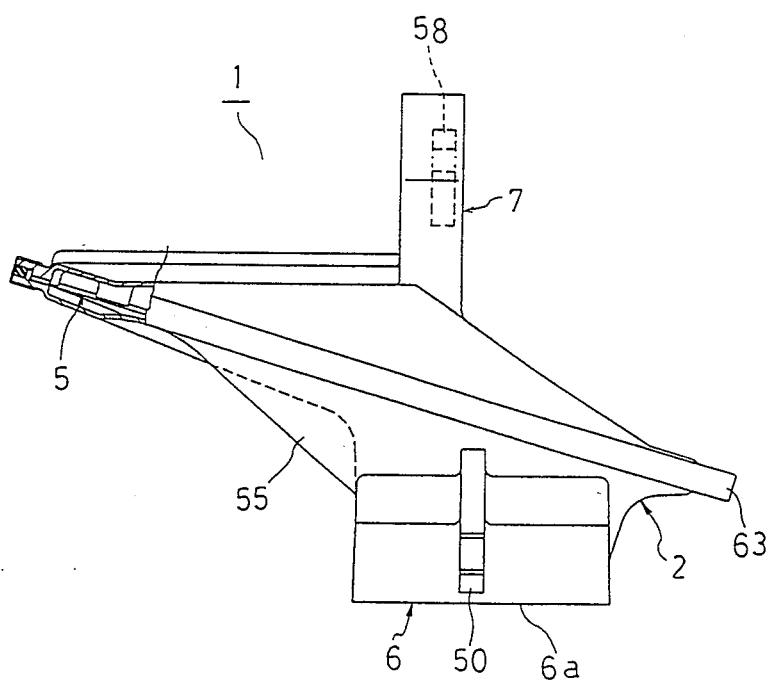
FIG. 1 is a front elevational view of the oil strainer of the present invention.
Figure 3:
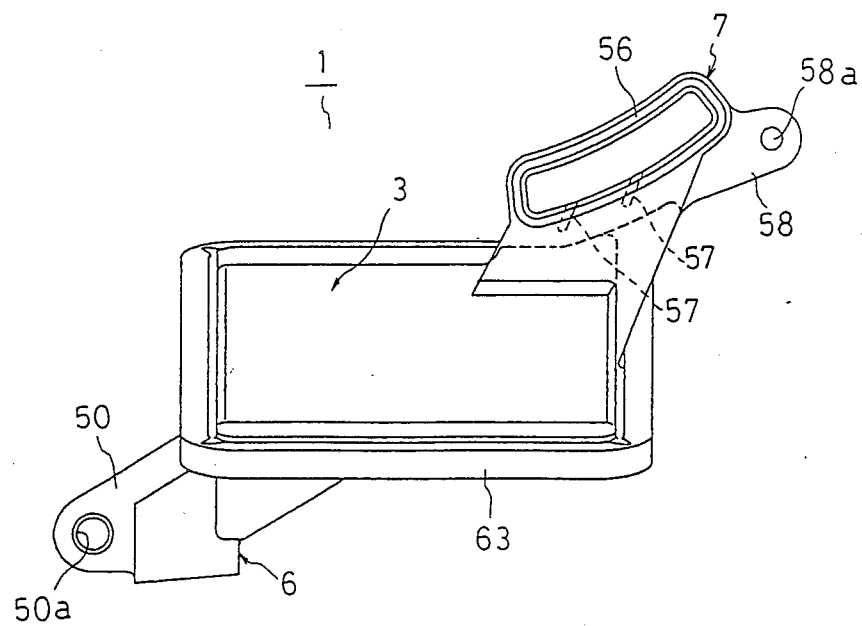
FIG. 3 is a side elevational view of the oil strainer of the present invention.
Figure 4:
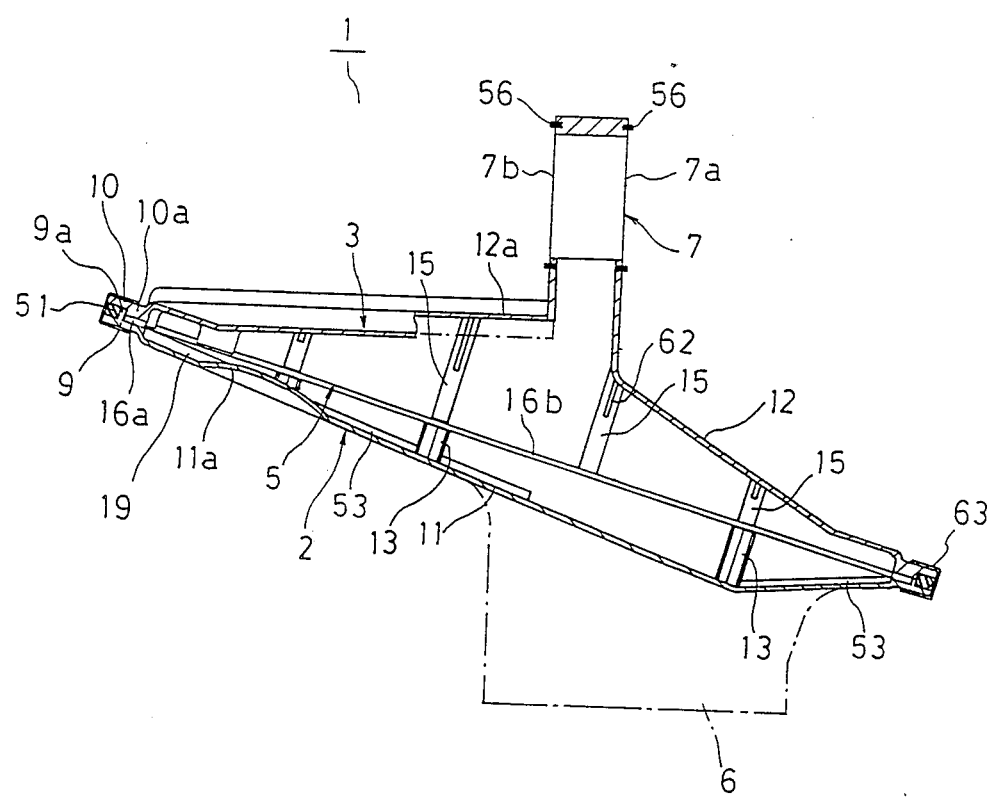
FIG. 4 is a cross sectional view taken along the line IV—IV of FIG. 2.

The oil strainer 1, as shown in FIG. 1 to FIG. 4, comprises a lower body 2 and an upper body 3, made from plastic or metal, and a filter element 5 interposed between the bodies 2, 3. A suction section 6 is provided in the lower body 2 on the bottom side in an offset manner. A downward-facing suction port 6a is provided on the suction section 6, and a mounting lug 50 with an unloaded hole 50a reinforced with a metal bushing is formed in a downward projecting manner. The body 2 is provided with a peripheral section 9 appearing in a rectangular shape on the plan view. The peripheral section 9 is formed slanted at a prescribed angle with respect to the suction section 6, when viewed from the side. A protrusion 9a is formed on the peripheral section 9 extending over the entire circumference. An O-ring 51 is maintained on the outside of the protrusion 9a. The lower body 2, as shown in detail in FIG. 4, is provided with a bottom surface 11, formed in an angled shape with a deeper portion for the suction port 6. A plurality of supporting bosses 13 are provided, attached almost perpendicularly to the bottom surface 11. An arc-shaped section 11a is formed in the bottom surface 11 close to the edge remote from the suction section 6a. The apex of the arc-shaped section 11a is close to the filter element 5. A short rib 53 is formed on the inclined inner surface of the bottom surface 11, and a reinforcing rib 55 for reinforcing the suction section 6 is formed on the outside of the bottom section 11.

An inclined discharge section 7 is integrally formed almost centrally positioned on the upper body 3 in an offset manner on the side opposite to the suction section 6. The discharge section 7 is provided with a pair of ports 7a, 7b on the left and right sides of the discharge section 7 respectively. O-rings 56, 56 having a D-shape in cross section are mounted in the openings 7a, 7b, respectively. The O-rings 56, 56 provide an oil tight seal at the suction port 22 of the pump body 21 and the oil channel opening 25 of the transaxle casing 23, respectively. As shown in detail in FIG. 3, auxiliary members 57, 57 are bridged across the ports 7a, 7b. A positioning lug 58 with a pin opening 58a is formed projecting from the side opposite the discharge section 6. The body 3 is provided with a peripheral section 10 which is aligned with the peripheral section of the body 2. A projecting section 10a for restraining the filter element 5 is formed extending over the full circumference of the peripheral section 10. The peripheral section 10 is formed sloping at a prescribed angle with respect to the discharge section 7. Accordingly, the filter element 5 which is interposedly supported by the peripheral section 10 and the peripheral section 9 of the lower body 2 is also installed slanted at a prescribed angle with respect to the suction section 6a and the discharge section 7. as shown in detail in FIG. 4, the upper body 3 is provided with a bottom surface 12 with an angled shape which allows a deep configuration for the discharge section 7, and, on the side of the bottom surface extending in one direction, a part 12a which is aligned with the discharge section 7 has a deep stepped structure. The bottom surface 12 on the upper body 3 has a more acute and more deeply angled structure than the bottom surface 11 on the lower body 2. A prescribed number of the supporting bosses 15 are erected on the bottom surface 12. The individual supporting bosses 15 are each positioned almost directly opposite the individual supporting bosses 13 of the lower body 2 to interposedly support the filter element 5.

Figure 5:
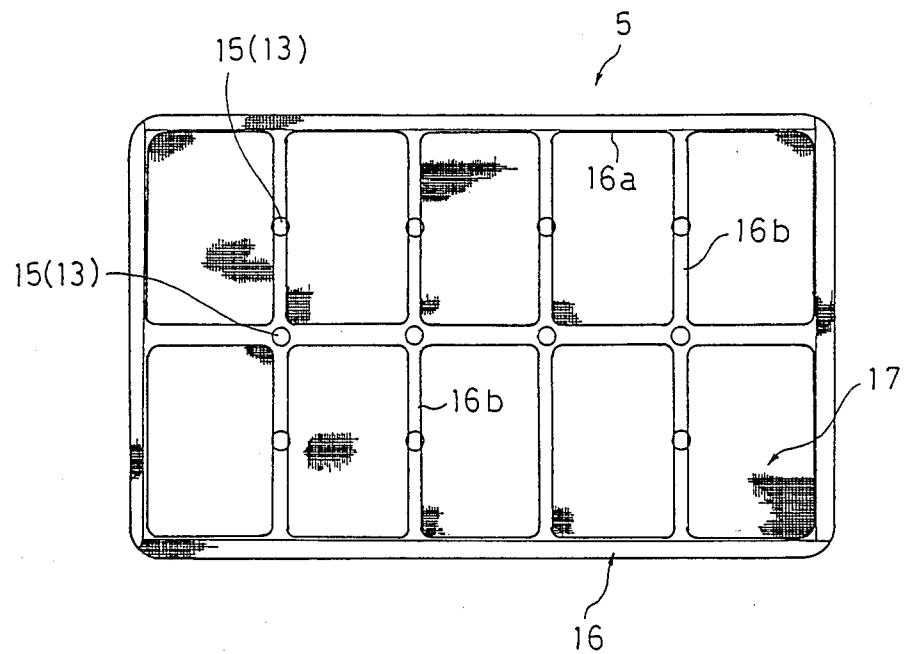
FIG. 5 is a plan view showing the filter element of the oil strainer of the present invention.

The filter element 5, as shown in FIG. 5, is provided with a lattice-shaped frame 16 formed of steel plate. A screen 17 fabricated from thin metal wire is stretched on the frame 16. The respective peripheral sections 9, 10 of the bodies 2, 3 contact and interposedly support the outer frame 16a of the frame 16. The supporting bosses 13, 15 contact and interposedly support a lattice section 16b at the prescribed positions. A rib 62 extends along a contour line of the bottom surface 12 in the supporting boss section on the bottom section 12.

In the oil strainer 1 of the present invention, the filter element 5 is interposedly supported between the lower body 2 and the upper body 3. On the two peripheral sections 9, 10 which are joined in an oiltight state through an O-ring 51, a caulking member 63 fabricated from a rectangular annular metal plate is integrally formed to provide a caulked joint. At this time, the filter element 5 is positioned so that the frame 16 is faced toward the upper body 3, and the outer frame 16a is interposedly supported by the peripheral sections 9, 10 (10a), while the lattice section 16b is supported by the supporting bosses 13, 15 to ensure that the prescribed position is maintained.

The oil strainer 1, as shown in FIG. 7 is installed inside the space 46a close to the front surface C of the transaxle casing 23. The pin 47 is insertedly positioned in the pinhole 58a of the positioning lug 58. The bolt 48 passes through the unloaded hole 50a of the mounting lug 50 and is secured by screwing into the bolt hole of the transaxle casing 23. In this status, on securing the pump body 21 on the front surface C of the casing 23, the two discharge ports 7a, 7b of the discharge section 7 are made oiltight by installation of the O-rings 56, 56 in an interposedly supported manner between the opening of the oil channel 25 of the casing 23 and the pump suction port 22. At this time, by applying compression with the bolt of the pump body 21, the O-rings 56, 56 of the discharge section 7 are intimately and uniformly extended over the entire periphery to provide a reliable seal between the port 7a and the suction port 22, and between the port 7b and the oil channel 25. Subsequently, the transaxle housing 20 is secured in the transaxle casing 23. The oil strainer 1 is provided in the oil sump space 46 formed by the casing 23 and the housing 20.

Next, the operation of the present invention will be explained.

The rotation of the engine crank shaft is transmitted to the torque converter 32 of the automatic transmission A, and then to the three-speed transmission gear 37 from the first shaft 29. Next, the transmission gear section 37 is suitably shifted by the suitable activation of the clutch section 39 and the brake section 35, based on the oil pressure from the valve body 26. The prescribed rotation is transmitted to the two-speed transmission gear section 42 on the second shaft 30 through the counter drive gear 36 and the driven gear 41. The gear section 42 is also suitably shifted based on the oil pressure from the valve body 26 in the same way as the gear secion 37, and the rotation is transmitted to the second shaft 30 and the output gear 40. The rotation of the output gear 40 is transmitted to the front differential device 43 through the ring gear 43a, then transmitted to the left and right front wheels from the left and right front axle gears 31a 31b. In addition to the operating oil supplied to the clutch section 39 and the brake section 35, oil is supplied for lubrication to each lubrication position through a pair of oiling holes 29a, 30a, and the like, in the first shaft 29 and the second shaft 30 respectively.

The drain oil from the respective hydraulic servos for the clutch section 39 and the brake section 35 is discharged from the valve body 26 into the oil channel of the casing 23. This oil is directly sucked into the suction port 22 of the oil pump 21 through the ports 7a, 7b of the discharge section 7 of the oil strainer 1. In addition, the oil used for lubrication is accumulated in the oil sump 46. The oil in the oil sump, as opposed to the operating oil from the valve body 26 which is comparatively clean, contains burrs and the like from the gears and the like and therefore contains a large amount of foreign matter. Then, the shortage of oil sucked in from the valve body 26 directly to the oil pump 21 is made up from the oil sump 46 through the oil strainer suction section 6 and the filter element 5 of the strainer 1, in which the foreign material is removed. This oil is sucked into the suction port 22 of the oil pump 21 through the port 7a of the suction section 7. At this time, in the oil strainer 1, the lower and upper bodies 2, 3 are formed with an angled shape, and an adequate flow channel cross section is provided to cope with the flow volume at each cross section. In particular, in the upper body 3, the oil is conducted to the discharge section 7 through the adequate flow channel area, corresponding to the flow volume at each cross section where no resistance is encountered in the flow through each section of the screen 17. The screen 17 is, due to the joint efforts of the deep bottom surface 12 and the supporting bosses 15, reliably prevented from being bent and adhered to the bottom surface 12, so that an adequate flow channel area is always ensured. In addition, the filter element 5 is arranged in a slanting manner and has an area larger in comparison with the projected area, that is the installed space, so that high strainer performance is maintained. The foreign matter trapped in the screen 17 of the filter element 5 (in particular large pieces of foreign matter which flow easily and do not blind the screen) passes over the arc-shaped section 11a, together with the oil flow, and accumulates in the peripheral section 19.

TECHNICAL ADVANTAGES OF THE INVENTION

As indicated in the foregoing explanation, the oil strainer (1) and bodies (2), (3) of the present invention are arranged in an angled shape so that a large flow channel area is obtained which can handle a large flow volume. Therefore, an adequate flow volume is assured, and resistance in the flow channel is decreases. In addition, the supporting bosses (13), (15) combine to support the filter element (5), the screen (17) is reliably prevented from being bent and adhered to the bottom surface (12). Further, because the filter element (5) is arranged in a slanting manner, a comparatively large filter area can be obtained in comparison with the projected area. Consequently, a compact structure is obtained while the performance, durability, and reliability of the oil strainer (1) can be increased.

In addition, because an arc-shaped section (12a) is formed in the bottom surface (12) close to the peripheral edge on the far side from the suction section (6) of the suction side body (2), foreign matter trapped on the filter element (5) (especially large pieces of foreign matter) is collected in the peripheral section (19) by the arc-shaped section (12a), so that an increase in suction resistance from blinding of the filter element (5) can be prevented to a large extent.

Further, because the oil strainer (1) is interposed between the pump body (21) and the transaxle casing (23), it is unnecessary to employ troublesome installation procedures. The installation becomes extremely simple, an the O-rings (56) between the discharge section (7) of the strainer (1) and the casing (23) and the pump body (21) are reliably and accurately tightened, so that seal performance can be improved.

Also, the discharge oil from the valve body (26) and the oil sucked up through the filter element (5) are conducted directly to the suction port (22) of the pump body (21) through the discharge section (7), so that any piping to the oil pump (21) can be kept short, and pressure drop and the like in the pipe line as a result of increased resistance can be reliably prevented.

What is claimed is:

1. An oil strainer for use with an automatic transmission, comprising a suction side body having a suction section, a discharge side body having a discharge section, and a filter element interposed between the two bodies, wherein the improvement comprises:
    the two bodies which are constructed with an angled cross section to provide a deep suction section and a deep discharge section, and have peripheral edge sections mutually contacted to form an oiltight structure, and a bottom surface from which a plurality of supporting bosses are projected; and
    the filter element which has a peripheral edge section interposed between the peripheral edge sections of the two bodies and a central section supported by the supporting bosses, and is secured between the two bodies and slanted at a prescribed angle with respect to the suction section and the discharge section.

2. An oil strainer of claim 1, wherein an arc-shaped section is formed on the bottom surface of the suction side body adjacent to peripheral edge section remote from the suction section.

3. An oil strainer of claim 1 in combination with a mounting configuration for mounting the oil strainer to the automatic transmission, wherein the discharge section formed in the discharge body of the oil strainer is provided with an opening on the left and right sides;
    the left and right side openings in the discharge section are respectively contacted in an oiltight manner with a suction port of a pump body and an opening of an oil channel formed in a transaxle casing, so that the oil strainer is interposedly supported between the pump body and the transaxle casing; and
    oil passing through the filter element of the strainer is supplied to the suction port of the pump body together with oil directly discharged from a valve body through the oil channel of the transaxle casing.

* * * * *